United States Patent
Savonnet

(10) Patent No.: US 10,457,750 B2
(45) Date of Patent: Oct. 29, 2019

(54) THERMOSET FOAMS, AND METHOD FOR MANUFACTURING SAME FROM REDUCING SUGARS AND AMINES

(71) Applicant: SAINT-GOBAIN ISOVER, Courbevoie (FR)

(72) Inventor: Marie Savonnet, Paris (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 134 days.

(21) Appl. No.: 15/553,615

(22) PCT Filed: Feb. 18, 2016

(86) PCT No.: PCT/FR2016/050372
§ 371 (c)(1),
(2) Date: Aug. 25, 2017

(87) PCT Pub. No.: WO2016/139401
PCT Pub. Date: Sep. 9, 2016

(65) Prior Publication Data
US 2018/0016356 A1  Jan. 18, 2018

(30) Foreign Application Priority Data
Mar. 2, 2015 (FR) .................................... 15 51723

(51) Int. Cl.
| C08B 30/12 | (2006.01) |
| C08J 9/02 | (2006.01) |
| C08J 9/228 | (2006.01) |
| C08L 61/20 | (2006.01) |
| C08L 3/02 | (2006.01) |

(52) U.S. Cl.
CPC ............. *C08B 30/12* (2013.01); *C08J 9/02* (2013.01); *C08J 9/228* (2013.01); *C08L 3/02* (2013.01); *C08L 61/20* (2013.01); *C08J 2205/042* (2013.01); *C08J 2205/052* (2013.01); *C08J 2300/24* (2013.01); *C08J 2361/20* (2013.01)

(58) Field of Classification Search
CPC .............. C08B 30/12; C08J 9/02; C08J 9/228
See application file for complete search history.

(56) References Cited

U.S. PATENT DOCUMENTS

| 2007/0027283 A1* | 2/2007 | Swift ................. C07H 5/04 527/312 |
| 2007/0123679 A1 | 5/2007 | Swift et al. |
| 2007/0123680 A1 | 5/2007 | Swift et al. |
| 2007/0142596 A1 | 6/2007 | Swift et al. |
| 2010/0130649 A1 | 5/2010 | Swift et al. |
| 2011/0135937 A1 | 6/2011 | Swift et al. |
| 2011/0220835 A1 | 9/2011 | Swift et al. |
| 2013/0133548 A1 | 5/2013 | Shooshtari et al. |
| 2013/0234362 A1 | 9/2013 | Swift et al. |
| 2013/0236650 A1 | 9/2013 | Swift et al. |
| 2013/0237113 A1 | 9/2013 | Swift et al. |
| 2013/0244524 A1 | 9/2013 | Swift et al. |
| 2015/0239778 A1 | 8/2015 | Alavi et al. |
| 2015/0353765 A1 | 12/2015 | Swift et al. |

FOREIGN PATENT DOCUMENTS

EP       2457943 A1 *  5/2012 ............... C08J 5/24

OTHER PUBLICATIONS

International Search Report dated Jun. 3, 2016 in PCT/FR2016/050372 filed Feb. 18, 2016.

* cited by examiner

*Primary Examiner* — Vu A Nguyen
(74) *Attorney, Agent, or Firm* — Oblon, McClelland, Maier & Neustadt, L.L.P.

(57) ABSTRACT

A process for manufacturing a solid thermoset foam includes the following successive stages: (a) providing an expandable and thermosetting composition including a first reactant chosen from reducing sugars and a second reactant chosen from primary amines, primary amine acid addition salts, secondary amines, secondary amine acid addition salts, and ammonium salts of formula $R''^-(NH_4^+)_n$, where n is an integer at least equal to 1 and $R''^-$ represents the residue of an organic or inorganic acid; (b) introducing the expandable and thermosetting composition into a mold or applying the expandable composition to a support so as to form a film having a thickness at least equal to 1 mm; and (c) heating the expandable and thermosetting composition to a temperature at least equal to 140° C. to react the first reactant with the second reactant and to form, by polymerization and chemical foaming, a block of solid thermoset foam.

15 Claims, No Drawings

THERMOSET FOAMS, AND METHOD FOR MANUFACTURING SAME FROM REDUCING SUGARS AND AMINES

The present invention relates to solid thermoset foams obtained by chemical reaction and foaming of an expandable composition containing Maillard reactants, namely reducing sugars and amines and amine salts.

The manufacture of insulating products based on mineral wool generally comprises a stage of manufacture of glass or rock fibers by a centrifugation process. On their journey between the centrifugation device and the belt for collecting the fibers, an aqueous sizing composition, also known as binder, is sprayed over the fibers, which are still hot, and is subsequently subjected to a thermosetting reaction at temperatures of approximately 200° C.

The phenolic resins used for several decades as binders have been increasingly replaced by products resulting from renewable sources and which emit no or very little formaldehyde, a compound regarded as being potentially harmful to human health.

There are thus known, from the application WO 2007/014236 and the corresponding application US 2007/0027283, sizing compositions or binders based on reducing sugars and on amines or on ammonium salts which, inter alia, by a Maillard reaction, cure and bind the glass fibers to which they are applied.

The applications WO 2009/019232 and WO 2009/019235 similarly disclose binders for glass fibers containing at least one reducing sugar and ammonium phosphate, sulfate, nitrate or carbonate, these reactants being capable of reacting by Maillard reaction after application to the glass fibers directly after formation of the fibers.

The application US 2013/0133548 describes aqueous binder compositions for mineral fibers based on aldehydes, in particular on glucose, and on amines. This document does not report the formation of foams. In examples 2-14, an aqueous composition containing dextrose and hexamethylenediamine is first dried at 100° C. and then cured by heating at a temperature of 200° C. The Maillard reaction does not take place during the heating stage as the temperature is insufficiently high and the dry composition is certainly insufficiently fluid for a foam to form during the curing stage. The resulting polymers are described as hard.

The present invention is based on the surprising discovery that these sizing compositions, when they are heated in a more concentrated form above a certain temperature (approximately 150° C.), instead of spraying them over hot glass fibers, are strongly foaming. Release of gas takes place at the same time as the complex reaction of condensation of the monomers (Maillard reaction). The liquid starting composition, introduced into an open container and exposed to a sufficient heat, increases in volume, thickens and finishes by curing, giving rise, after a few minutes, to a rigid dark-colored foam.

This foaming takes place in the absence of physical foaming agent other than the water possibly present in the starting composition. The presence of water in the mixture of the reactants (reducing sugars and amines/ammonium salts) is not, however, essential to the foaming and does not make it possible to explain the phenomenon observed. This is because, as long as the composition contains liquid water, its temperature does not exceed approximately 100° C. and the Maillard reaction responsible for the curing cannot take place. In other words, when the Maillard reaction begins, all of the liquid water initially present has evaporated.

A phenomenon of chemical foaming thus had to occur. One or more of the starting ingredients had to undergo a thermal decomposition or to react with one another, releasing a gas in an amount sufficient for the production of foams.

A subject matter of the present invention is consequently the use of a composition containing:
- a first reactant chosen from reducing sugars,
- a second reactant chosen from primary amines, primary amine acid addition salts, secondary amines, secondary amine acid addition salts, and ammonium salts of formula $R''^-(NH_4^+)_n$ where n is an integer at least equal to 1 and $R''^-$ represents the residue of an organic or inorganic acid, as expandable and thermosetting composition for the manufacture of an insulating product of foam type.

More particularly, a subject matter of the present invention is a process for the manufacture of a solid thermoset foam, which can be used as thermal insulation product, comprising the following successive stages:

(a) providing an expandable and thermosetting composition containing:
- a first reactant chosen from reducing sugars,
- a second reactant chosen from primary amines, primary amine acid addition salts, secondary amines, secondary amine acid addition salts, and ammonium salts of formula $R''^-(NH_4^+)_n$ where n is an integer at least equal to 1 and $R''^-$ represents the residue of an organic or inorganic acid, (b) introducing the expandable and thermosetting composition into a mold or applying the expandable composition to a support so as to form a film having a thickness at least equal to 1 mm, (c) heating the expandable and thermosetting composition to a temperature at least equal to 140° C., so as to react the first reactant with the second reactant and to form, by polymerization and chemical foaming, a block of solid thermoset foam.

The term "reducing sugars" is understood to mean the carbohydrates of formula $C_n(H_2O)_p$ exhibiting at least one aldehyde or ketone group (reducing group). The reducing sugars which can be used in the present invention encompass monosaccharides and polysaccharides (disaccharides, oligosaccharides and polysaccharides proper).

Mention may be made, as examples of monosaccharides, of those comprising from 3 to 8 carbon atoms, preferably aldoses and advantageously aldoses containing from 5 to 7 carbon atoms. The aldoses which are particularly preferred are natural aldoses (belonging to the D series), in particular hexoses, such as glucose, mannose and galactose.

Lactose or maltose are examples of disaccharides which can be used as reducing sugars.

Use may also advantageously be made of starch hydrolysates obtained by enzymatic hydrolysis or acid hydrolysis of starch. The degree of hydrolysis is generally characterized by the dextrose equivalent (DE), defined by the following relationship:

$$DE = 100 \times \left( \frac{\text{number of glycoside bonds cleaved}}{\text{number of glycoside bonds in the starting starch}} \right)$$

The hydrolysates having a DE of less than 20 do not foam to any great extent and use will preferably be made of the starch hydrolysates exhibiting a DE of greater than 20, also known as glucose syrups. The hydrolysates having a DE of between 50 and 90 are particularly preferred.

Generally, any oligomer or precursor of a reducing sugar capable of releasing a reducing sugar under the conditions of the reaction is regarded as being able to be used as first reactant in the present invention.

The second reactant can be a primary amine of formula $R^1NH_2$ or a secondary amine of formula $R^1R^2NH$, where $R^1$ and $R^2$ independently represent preferably a linear alkyl, cycloalkyl, alkenyl, cycloalkenyl or aryl radical, optionally containing one or more heteroatoms.

Mention may be made, as examples of amines, of ethylamine, diethylamine, dimethylamine, ethylpropylamine, aniline, 1-naphthylamine, 2-naphthylamine and para-aminophenol.

The second reactant can also be an acid addition salt of such a primary or secondary amine. The acids used for the formation of such a salt are, for example, monocarboxylic or polycarboxylic acids, sulfuric acid, nitric acid, organosulfonic acids, such as lignosulfonate, and phosphoric acid.

The polycarboxylic acids are preferably dicarboxylic, tricarboxylic and tetracarboxylic acids.

The dicarboxylic acids encompass, for example, oxalic acid, malonic acid, succinic acid, glutaric acid, adipic acid, pimelic acid, suberic acid, azelaic acid, sebacic acid, malic acid, tartaric acid, tartronic acid, aspartic acid, glutamic acid, fumaric acid, itaconic acid, maleic acid, traumatic acid, camphoric acid, phthalic acid and its derivatives, particularly those containing at least one boron or chlorine atom, tetrahydrophthalic acid and its derivatives, in particular those containing at least one chlorine atom, such as chlorendic acid, isophthalic acid, terephthalic acid, mesaconic acid and citraconic acid.

The tricarboxylic acids encompass, for example, citric acid, tricarballylic acid, 1,2,4-butanetricarboxylic acid, aconitic acid, hemimellitic acid, trimellitic acid and trimesic acid.

Mention may be made, as tetracarboxylic acid, for example, of 1,2,3,4-butanetetracarboxylic acid and pyromellitic acid.

Use will preferably be made, among the carboxylic acids, of citric acid, which decomposes under the reaction conditions and releases $H_2O$, $CO_2$ and also a reactive gaseous anhydride.

Finally, the second reactant can be an ammonium salt of formula:

$$R^{n-}(NH_4^+)_n$$

where n is an integer at least equal to 1 and $R^{n-}$ represents the radical from an organic or inorganic acid. The organic or inorganic acid is preferably chosen from those listed above.

The expandable and thermosetting compositions used in the present invention for the formation of solid foams generally contain water. This water essentially acts as solvent for the first and second reactants and not as physical foaming agent, as explained above.

Given that the expandable composition used in the process of the present invention does not have to be finely dispersed in air, it is less crucial than in the case of a binder for mineral fibers to take care that its viscosity is sufficiently low. While an aqueous binder for mineral fibers comprises, at the time of the spraying, at least 90%, indeed even 95%, water, the expandable compositions of the present invention are much more concentrated and viscous.

They advantageously contain less than 50% by weight of water, more advantageously less than 40% by weight of water, in particular at most 35% by weight, preferably at most 25% by weight, more preferably at most 15% by weight and ideally at most 5% by weight of water. The lower this initial water content, the greater the reduction in the energy cost related to the necessary evaporation of this water.

The dry matter content of the expandable composition before heating is thus at least equal to 50% by weight, in particular at least equal to 65% by weight, preferably at least equal to 75% by weight, more preferably at least equal to 85% by weight and ideally at least equal to 95% by weight.

The first and second reactants represent, in total, at least 70%, preferably at least 80% and in particular at least 90% of the dry weight of the expandable composition.

The first reactant preferably represents from 30 to 95% by weight, in particular from 60 to 90% by weight, and the second reactant preferably represents from 5 to 70% by weight, preferably from 10 to 40% by weight, of the total weight of the first and second reactants.

Although the first and second reactants are the predominant and essential constituents of the expandable composition, the latter can contain a number of other adjuvants and additives intended to improve the properties of the final thermoset foams or to reduce the production costs. The total amount of these adjuvants and additives preferably, however, does not exceed 30% of the dry weight of the expandable composition.

Thus, the expandable composition can contain, for example, one or more surface-active agents intended to reduce the mean dimension and the dispersion in the sizes of the pores of the final foam or to facilitate the incorporation of a filler. The expandable composition advantageously contains from 1 to 15% by weight, preferably from 2 to 10% by weight, with respect to the dry weight of the total expandable composition, of one or more surface-active agents.

The expandable composition used in the present invention can additionally contain up to 20% by weight, preferably up to 10% by weight, with respect to the dry weight of the total expandable composition, of one or more inorganic or organic fillers.

Finally, the expandable composition can contain one or more other additives conventionally used in the industry for the processing and transformation of polymers, such as dyes, pigments, antibacterial or antifungal agents, flame retardants, UV absorbers or hydrophobic agents. These additives represent, in total, preferably at most 10% of the dry weight of the composition.

The expandable composition is preferably essentially devoid of organic physical blowing agent.

Its pH is generally between 5 and 9.

In the process of the present invention, reactive compositions, known as such in a very dilute form, are thus used in a completely different way from that described in the documents of the state of the art mentioned in the introduction. They are not sprayed in the form of fine droplets over hot mineral fibers for the purpose of the formation of a blanket of fibers adhesively bonded to one another but remain in the compact undispersed form. Their dry matter content is considerably higher than that of the compositions of the state of the art. However, care will have to be taken that the process according to the invention is carried out so that the viscosity of the expandable and thermosetting compositions remains sufficiently low at the time of the heating to 140° C. for a foam to be able to be formed before complete curing of the composition.

When the expandable composition is spread in the form of a continuous film over a support, the thickness of the film before heating, that is to say before expansion and curing, is preferably at least equal to 2 mm, in particular at least equal to 5 mm and more preferably at least equal to 10 mm.

The volume of the foam block formed can vary between very wide limits. When the expandable composition is used in a continuous process, for example forming strips or profiled elements of insulating materials, it is potentially infinite. When the expandable composition is used to form separate blocks, for example slabs or sheets of foams, its amount is preferably such that the volume of each block of solid thermoset foam is at least equal to 500 cm$^3$, preferably at least equal to 0.001 m$^3$ and in particular at least equal to 0.01 m$^3$.

The block of foam is preferably provided in the form of a slab.

In order to react the first and second reactants, it is necessary to heat the expandable composition to a temperature of at least 140° C. This is because it is known that the Maillard reaction between a reducing sugar and an amine only takes place above this temperature. The reaction temperature will preferably be between 150° C. and 180° C. This temperature is, of course, that measured at the heart of the reaction mixture.

Use may in principle be made, in order to heat the expandable composition in stage (c), of any standard means known in the field of the processing and transformation of polymers, such as hot air, thermal radiation, microwaves or bringing into contact with a hot support (mold).

Of course, the temperature of the heating means (drying oven, support, mold) can be greater than the abovementioned reaction temperature, for example between 160 and 210° C.

Another subject matter of the present invention is a solid foam obtainable by the process which is the subject matter of the present invention. This foam is based on melanoidins, the complex reaction products of the Maillard reaction, and can contain up to approximately 25% by weight of other components, in particular inorganic fillers. It is important to note that the content of these other components, in particular of inorganic fillers, of the cured foam can be greater than that of the starting expandable and thermosetting composition. This is because the Maillard reaction between the first and second reactants is accompanied by a release of gaseous products, such as $CO_2$, $NH_3$, $H_2S$ or $SO_2$, and the fraction of melanoidins in the final foam is thus lower than the fraction, by dry weight, of the first and second reactants of the initial composition.

The solid foams prepared by the process of the invention are dark brown to black in color. Their density is between 30 and 60 kg/m$^3$.

They exhibit a closed porosity with a mean diameter of the pores, determined by X-ray tomography, of between 100 and 800 nm.

EXAMPLES

Several expandable and thermosetting compositions are prepared by adding an aqueous solution of the second reactant to a powder of the first reactant. The mixture is stirred at ambient temperature until the powder has dissolved. The respective amounts of the first and second reactants, expressed as dry matter, and also the total solids content of the resulting compositions, are shown in table 1.

Each of the compositions is introduced into a flat-bottomed aluminum dish (diameter of 5 cm) so as to form a film having a thickness of approximately 1 mm. The dishes are introduced into a drying oven heated to 200° C. After 20 minutes, they are removed and allowed to cool to ambient temperature and the thickness of the foam formed is observed.

TABLE 1

| Reactant 1 | Reactant 2 | Solids content | Thickness of the foam |
|---|---|---|---|
| 32.5 parts of D-glucose monohydrate | 67.5 parts of ammonium citrate | 63% | +++ |
| 85 parts of D-glucose monohydrate | 15 parts of ammonium sulfate | 75% | +++++ |
| 85 parts of maltodextrin (DE =3-20) | 15 parts of ammonium sulfate | 61% | + |
| 85 parts of D-glucose monohydrate | 15 parts of ammonium carbonate | 75% | +++ |

—: less than 0.5 cm
+: 0.5 to 1 cm
++: 1.1 to 2 cm
+++: 2.1 to 3 cm
++++: 3.1 to 4 cm
+++++: more than 4 cm By way of comparison, a series of compositions identical to those of table 1, apart from the fact that the first reactant (reducing sugar) is replaced by a polyol not comprising a reducing group, is prepared. They are cured in a drying oven at 200° C. for 20 minutes. The results observed are recorded in table 2.

TABLE 2

| Polyglycerol | Reactant 2 | Solids content | Foam | Appearance |
|---|---|---|---|---|
| 32.5 parts | 67.5 parts of ammonium citrate | 63% | — | Black crust |
| 85 parts | 15 parts of ammonium sulfate | 75% | — | Beige-colored transparent film |
| 85 parts | 15 parts of ammonium carbonate | 75% | — | Colorless transparent |

Only the sample containing ammonium citrate seems to have reacted. Its color has changed and its consistency is hard but no foam formation is observed.

For the other two samples containing, as second reactant, ammonium sulfate and ammonium carbonate, the color of the reaction mixture has virtually not changed. A transparent film which is very slightly colored is observed, but no foam formation.

The invention claimed is:

1. A process for manufacturing a solid thermoset foam, comprising the following successive stages:
   (a) making available an expandable and thermosetting composition containing:
   a first reactant chosen from reducing sugars,
   a second reactant chosen from primary amines, primary amine acid addition salts, secondary amines, secondary amine acid addition salts, and ammonium salts of formula $R''^-(NH_4^+)_n$ where n is an integer at least equal to 1 and $R''^-$ represents a residue of an organic or inorganic acid,
   the expandable and thermosetting composition containing less than 50% by weight of water,
   (b) introducing the expandable and thermosetting composition into a mold or applying the expandable and thermosetting composition on a support so as to form a film having a thickness at least equal to 1 mm, (c) heating the expandable and thermosetting composition to a temperature at least equal to 140° C., so as to react the first reactant with the second reactant and to form, by polymerization and chemical foaming, a block of solid thermoset foam.

2. The process as claimed in claim 1, wherein an amount of the expandable and thermosetting composition is such that the volume of the resulting block of solid thermoset foam is at least equal to 500 cm$^3$.

3. The process as claimed in claim 1, wherein the thickness of the film is at least equal to 2 mm.

4. The process as claimed in claim 1, wherein the block of solid thermoset foam is a slab.

5. The process as claimed in claim 1, wherein the expandable and thermosetting composition contains at most 35% by weight of water.

6. The process as claimed in claim 1, wherein the first and second reactants represent, in total, at least 70% of the dry weight of the expandable and thermosetting composition.

7. The process as claimed in claim 1, wherein the first reactant is chosen from glucose and starch hydrolysates.

8. The process as claimed in claim 1, wherein the expandable and thermosetting composition additionally contains one or more surface-active agents.

9. The process as claimed in claim 1, wherein the expandable and thermosetting composition additionally contains up to 20% by weight, with respect to a total dry weight of the expandable and thermosetting composition, of one or more inorganic or organic fillers.

10. The process as claimed in claim 1, wherein the first reactant represents from 30 to 95% by weight and that the second reactant represents from 5 to 70% by weight of the total weight of the first and second reactants.

11. The process as claimed in claim 1, wherein an amount of the expandable and thermosetting composition is such that the volume of the resulting block of solid thermoset foam is at least equal to 0.01 m$^3$.

12. The process as claimed in claim 1, wherein the thickness of the film is at least equal to 10 mm.

13. The process as claimed in claim 1, wherein the expandable and thermosetting composition contains at most 5% by weight of water.

14. The process as claimed in claim 1, wherein the first and second reactants represent, in total, at least 90% of the dry weight of the expandable and thermosetting composition.

15. The process as claimed in claim 7, wherein the starch hydrolysates have a dextrose equivalent (DE) of greater than 20.

\* \* \* \* \*